United States Patent [19]
Piekarski et al.

[11] 3,843,620
[45] Oct. 22, 1974

[54] PROCESS FOR THE PRODUCTION OF POLYETHYLENE POWDER HAVING A HIGH DENSITY AND HIGH TAP DENSITY

[75] Inventors: Gottfried Piekarski; Anton Hundmeyer, both of Burghausen, Germany

[73] Assignee: Wacker Chemie GmbH, Munich, Germany

[22] Filed: May 16, 1972

[21] Appl. No.: 253,893

[30] Foreign Application Priority Data
May 26, 1971   Germany............................ 2126249

[52] U.S. Cl...... 260/94.9 C, 252/429 A, 252/429 B, 252/429 C, 260/94.9 E
[51] Int. Cl............................. C08f 1/44, C08f 3/06
[58] Field of Search............ 252/429 B; 260/94.9 C, 260/94.9 E

[56] References Cited
UNITED STATES PATENTS

| | | | |
|---|---|---|---|
| 2,974,133 | 3/1961 | Wiberg et al. | 260/94.9 C |
| 3,202,617 | 8/1965 | Enk et al. | 260/94.9 E |
| 3,227,702 | 1/1966 | Small et al. | 260/94.9 B |
| 3,328,378 | 6/1967 | Piekarski et al. | 260/94.9 E |
| 3,676,418 | 7/1972 | Tashiro et al. | 260/94.9 C |

FOREIGN PATENTS OR APPLICATIONS

| | | |
|---|---|---|
| 845,878 | 8/1960 | Great Britain |
| 1,122,157 | 7/1968 | Great Britain |
| 854,988 | 11/1960 | Great Britain |
| 828,201 | 2/1960 | Great Britain |
| 222,426 | 6/1959 | Australia |
| 838,028 | 6/1960 | Great Britain |
| 860,407 | 2/1961 | Great Britain |

*Primary Examiner*—Joseph L. Schofer
*Assistant Examiner*—Edward J. Smith
*Attorney, Agent, or Firm*—Hammond & Littell

[57] ABSTRACT

A process for the production of polyethylene powder of high density and tap high density comprising polymerizing ethylene at a temperature of from 20°C to 200°C and a pressure of from 1 to 100 atmospheres in the presence of a catalyst prepared from (a) organosilicon compounds with silicon-hydrogen bonds, (b) compounds of heavy metals of the IV to VI sub-group of the Periodic System, and (c) optionally, compounds of metals of the III main group of the Periodic System characterized in that the prepared catalyst, before polymerization, is treated at a temperature from −40°C to +60°C with oxygen for a time sufficient that from 1 percent to 70 percent, preferably from 5 percent to 50 percent of the compounds of heavy metals of the IV to VI sub-groups of the Periodic System present in a lower valence are oxidized to their highest valence and, optionally, the oxidized catalyst is further activated by the addition of monomeric and/or polymeric organic compounds of silicon and/or tin.

13 Claims, No Drawings

PROCESS FOR THE PRODUCTION OF POLYETHYLENE POWDER HAVING A HIGH DENSITY AND HIGH TAP DENSITY

THE PRIOR ART

Low pressure polyethylene powder, obtained from polymer suspensions, generally occurs as a light powder of low density, for example, 100 to 400 gm/1 (determined with the Stampfpulvometer [Tap-pak Volumeter] of J. Engelmann AG., Ludwigshafen a. Rh.; 60 blows in 16 seconds). In the region of the higher tap densites, these powders also contain considerable amounts of fines of below 70 $\mu$ grain size, which are undesirable in most cases of processing. If the polyethylene powder is obtained from melts, solutions or also from the gas phase, it is usually coarser, but has, however, a very porous grain of high specific surface (determination, according to BET) of, for example, 10 m$^2$/gm. The tap density of these powders amounts at most of 380 gm/1. The direct processing of such polyethylene powders to molded bodies is possible, if at all, only on special machines.

For these reasons it is generally customary to granulate low pressure polyethylene powder, obtained by known processes, before processing them to molded bodies or to subject them to another, always expensive, condensation or sintering process (see French Pat. No. 1,426,438 and DAS 1,189,700).

In order to raise the polymer tap density, it has already been proposed, to polymerize up to a higher solid contents (55 percent by weight) (see British Pat. No. 1,088,035). By this expedient, however, occasional cloggings of the discharge and dosing lines and a poor heat removal have to be accepted. In order to avoid this, it is recommended, according to U.S. Pat. No. 3,073,810, not to surpass a polymer concentration of 25% by weight in the reaction space.

It has also been known that indeed with catalysts, which were prepared according to DBP 1,191,105 and the German Offenlugungsschriften (DOS) 1,545,177 and 1,545,194, partially also high tap densities are obtained, but the dust part of the powder (grain size below 50 $\mu$) is disadvantageously high.

OBJECTS OF THE INVENTION

An object of the present invention is the development of a process and a catalyst for the production of polyethylene powder of high density and high tap density.

Another object of the present invention is the development in a process for the production of polyethylene powder of high density and high tap density which comprises polymerizing ethylene at a temperature of from 20°C to 200°C and a pressure of from 1 to 100 atmospheres in the presence of a polymerization catalyst prepared from (a) organo-silicon compounds containing hydrogen bonded the silicon, (b) compounds of heavy metals of the IV to VI sub-groups of the Periodic system, and (c) optionally, compounds of metals of the III main group of the Periodic System, the improvement which consists in treating said prepared catalyst, before said polymerization, with oxygen at a temperature of from −40°C to +60°C for a time sufficient that from 1 percent to 70 percent of the heavy metals of the IV to VI sub-groups of the Periodic System present in a lower valence are oxidized to their highest valence and, optionally, further activating the oxidized catalyst by the addition of a monomeric and/or polymeric organic compound of silicon and/or tin.

A still further object of the present invention is the development of a catalyst for the production of polyethylene powder of high density and high tap density consisting essentially of the reaction product of (a) an organo-silicon compound containing hydrogen bonded to silicon, (b) a compound of heavy metals of the IV to VI sub-groups of the Periodic system, and (c) optionally, a compound of metals of the III main group of the Periodic System, treated with oxygen at a temperature of from −40°C to +60°C for a time sufficient that from 1 percent to 70 percent of the heavy metals of the IV to VI sub-groups of the Periodic System present in a lower valence are oxidized to their highest valence, and (d) optionally, further activated by the addition of monomeric and/or polymeric organic compounds of silicon and/or tin to the oxidized catalyst.

These and other objects of the invention will become more apparent as the description thereof proceeds.

DESCRIPTION OF THE INVENTION

A process has now been found for the preparation of polyethylene powder of high density and high tap density by polymerization of ethylene at a temperature from 20°C to 200°C and a pressure from 1 to 100 atmospheres, with the use of a catalyst which was prepared from a. organo-silicon compounds containing hydrogen bonded to silicon,
b. compounds of the elements of the IV to VI sub-groups of the Periodic System, and
c. optionally, compounds of the III main group of the Periodic System.

The process is characterized in that the prepared catalyst is treated with oxygen at a temperature of from −40°C to +60°C so that 1 percent to 70 percent, preferably 5 percent to 50 percent, of the compounds of the IV to VI sub-groups of the Periodic System, present in a low valence, are oxidized, and optionally, monomeric and/or polymeric organic compounds of silicon and/or tin are added to the oxidized catalyst.

The oxidation of low pressure polyethylene catalysts, particularly Ziegler catalysts, has in itself been known. According to the DAS 1,074,858, the oxidation of the catalysts is carried out with oxygen. With this catalyst polymers are obtained, which exhibit relatively low molecular weights.

It has been further known from the German Auslegeschriften (DAS) 1,135,176 and 1,204,826, that by treatment of the catalysts with peroxides, catalysts are formed, which lead to polymers with increased molecular weights.

In comparison to this, by the oxygen treatment of the catalysts containing hydrogen bonded to silicon of the invention, suprisingly, polyethylene powders of high tap density where obtained, for example, 450 to 570 gm/1, with low specific surfaces (BET) of from 0.25 to 0.4 m$^2$/gm and grain size distributions, which have in the range below 50 $\mu$ only an amount of 2 percent or less. The powder grain is, therefore, very dense and the tap densities obtained approach those of granulates. The bulk density (according to DIN 53468 in gm/1) is also found correspondingly high. The density of the polyethylene (determined according to DIN 53479 on 1 mm pressed plates) is, dependent upon the molecular weight, between 0.940 and 0.965 gm/cm$^3$. The polymers of the invention are, therefore, highly dense polyethylene. The dry polymer powder can, on the basis of these properties, be processed on the conventional processing machine directly to the finished article without dust nuisance and without a preceding granulation.

If a so-called Ziegler catalyst (for example, according to DBP 973,626) is oxidized under the conditions of the invention procedure, catalysts, unsuitable for ethylene polymerization, are obtained.

The catalyst of the invention is preferably a catalyst for the production of polyethylene powder of high density and high tap density consisting essentially of the reaction product of (a) an organo-silicon compound containing hydrogen bonded to silicon, (b) a compound of heavy metals of the IV to VI sub-groups of the Periodic system, and (c) optionally, a compound of metals of the III main group of the Periodic system, heated with oxygen at a temperature of from −40°C to +60°C for a time sufficient that from 1 percent to 70 percent of the heavy metals of the IV to VI sub-groups of the periodic System present in a lower valence are oxidized to their highest valence, and (d) optionally, further activated by the addition of monomeric and/or polymeric organic compounds of silicon and/or tin to the oxidized catalyst.

The preoxidized catalyst is prepared in a known manner from organo-silicon compounds containing hydrogen bonded to silicon, the compounds of the IV to VI subgroups of the Periodic System, and optionally compounds of the III main group of the Periodic System. The respective measures, which are particularly suitable for the catalyst preparation, are, for instance, specified in German Pat. Nos. 1,191,105 and 1,214,407 and German Offenlegungsschriften (DOS) 1,545,177, 1,545,184 and 1,545,194. Preferably in the preparation of catalysts, which are subjected to the oxidation, according to the invention, the work is done without solvents or with only slight amounts of solvents.

Preferably the preoxidized catalyst is the reaction product of (1) one part by volume of an organosilicon compound containing hydrogen bonded to silicon, (2) from 0.5 to 2.0 parts by volume of a compound selected from the group consisting of halides, lower alkoxides and oxyhalides of heavy metals of the IV to VI sub-groups of the Periodic System, and preferably titanium, vanadium and chromium compounds, and (3) from 0 to 0.2 parts by volume of an aluminum compound selected from the group consisting of aluminum halides, aluminum lower alkoxides and lower alkyl aluminums, preferably aluminum trihalides, aluminum tri-lower-alkoxides and tri-lower alkyl aluminum. The catalyst is prepared by mixing the metal halides and/or alkoxides, and the organo-silicon compounds containing hydrogen bonded to silicon, as well as the optional aluminum compounds under good agitation, for instance, with a vibromixer, perhaps in the presence of small amounts of a solvent such as is utilized in the polymerization reaction. Substantially suitable for solvents are saturated hydrocarbons having 5 to 9 carbon atoms. The mixture of the catalytic raw materials is maintained for several hours with agitation, at a temperature of from 20°C to 80°C. During the reaction a hydrogen evolution occurs. The catalyst preparation is exacuted under the exclusion of moisture and air, in the presence of an inert atmosphere (nitrogen or hydrogen).

The organo-silicon compounds containing hydrogen bonded to silicon, used in the catalyst preparation, are, for example, triethylsilane, triethoxysilane, tetramethylsiloxane, tetramethylcyclotetrasiloxane and hydrogenpolysiloxanes, especially those having the formula:

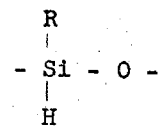

where R is alkyl having 1 to 6 carbon atoms, cycloalkyl having 5 to 6 carbon atoms and phenyl with the terminal silicons satisfied with R, hydrogen or, at most, one hydroxyl and having a viscosity of from 5 to 100 cSt (25°C), such as methylhydrogenpolysiloxane. Compounds of the elements of the IV to VI sub-groups are, for example, titanium tetrachloride, titanium trichloride in mixture with titanium tetrachloride, the addition complex $AlTi_3Cl_{12}$, vanadium oxychloride, vanadium tetrachloride and chlorotitanic acid esters, such as trichlorotitanic acid butyl ester, etc. Compounds of the III main group are, for example, aluminum chloride and aluminum bromide.

The oxidation of the catalyst or the catalyst suspension is carried out preferably by treatment with oxygen-containing gases, particularly air, at temperatures from −40 °C to +60°C, preferably at 0° to 40°C. The dry gas is introduced in a measured amount and during a definite time through the stirred catalyst suspension. The required amount of the oxidation depends on the amount of the low valence elements of the sub-groups, such as $Ti^{+++}$ or $V^{+++}$, present in the catalyst, which is determined by titration, and the selected oxidation temperature. When 1 percent to 70 percent, preferably 5 percent to 50 percent, of the lower oxidation stage compounds, present in the catalyst suspension, are oxidized to the higher oxidation stage, the oxidation is terminated. After the oxidation, preferably a dry inert gas, such as nitrogen or argon is bubbled through the suspension. The amount of inert gas used should be more than half of the amount of oxygen applied. This posttreatment is carried out for a few minutes, mostly about five minutes at room temperature.

The catalyst, treated with oxygen or with air, shows in the polymerization of ethylene at normal pressure already a relatively high activity. An increase in activity that is, a smaller amount of oxidized catalyst at equal space-time-yield of polymer product, can be attained by the addition of slight amounts of monomeric and/or polymeric organic compounds of silicon and/or tin. Thereby advantageously amounts between 0.1 to 30 percent by weight, based on the oxidized catalyst, are utilized. Preferably, monomeric silanes with at least one hydrogen atom bonded to silicon, particularly triethylsilane and/or tetraalkyl tin, particularly tetrabutyl tin, are used. Further examples of such compounds are diphenylsilane, tetramethyldisiloxane and tin tributylhydride. Also polymeric silicon compounds of various chains length are of importance, preferably hydrogenpolysiloxane compounds in the viscosity range from 2 to 50,000 cSt (25°C) with structural units of the general formula:

wherein R represents an optionally substituted alkyl or phenyl radical, particularly methylhydrogenpolysiloxane.

The addition of these compounds can be carried out immediately after the inert gas rinsing or also together with the diluting agents, such as hydrocarbons, before or during the polymerization.

The process for the preparation of polyethylene powder of high density and high bulk weight can be conducted both discontinuously and also continuously. Preferably the work is done thereby at temperatures between 50° to 90°C and at ethylene pressures from 5 to 20 atmospheres. Furthermore, also modified polyethylenes with the use of the oxidized and optionally activated catalysts can be prepared. For this, together with ethylene, up to 10 mol percent, based on the ethylene, of a higher α-olefin having 3 to 6 carbon atoms, such as propylene, butene-1 or hexene-1 are used for the polymerization.

The polymerization process can be carried out both in the gas phase and particularly in inert liquids, whereby saturated hydrocarbons having 5 to 9 carbon atoms are particularly suitable, such as n-pentane, n-hexane, cyclohexane, n-heptane and isooctane.

The operation mostly takes place in autoclaves with agitators, dosing and withdrawal devices and the polymerization may be carried out continuously or also discontinuously. The polymer suspensions, often obtained by this process, are treated in a known manner (such as described in commonly assigned U.S. Patent application Ser. No. 152,761, filed June 14, 1971, now U.S. Pat. No. 3,775,389) with alcohol for the decomposition and solution of the catalyst, then the polyolefin is separated from the liquid phase and dried.

Another advantage of the claimed process consists in that with the use of the catalysts, according to the invention, polymerizations with high solid-content concentration can be conducted, for example, the polymer suspension at a concentration of 50 percent by weight of polyethylene is still relatively thinly liquid and can be stirred easily. Thereby no precipitates occur and the available reaction space can be utilized better, whereby the production is increased.

It was further found that the oxidized catalyst can be very easily dissolved out of the polyethylene. Thus polymerizates with a slight residual ash content and better properties are obtained. In addition, lesser amounts of stabilizer additives are required.

The polyethylene powders, prepared according to the invention, can be utilized, on the basis of their high tap density, the high grain density and the good flowability or a relatively coarse grain size, as well as based on the low specific surface, which causes only a slight gas adsorption, on the various processing machines, such as presses, extruders, flame sprayers, injection molders and rotary casting processes, and for sintering coating. High quality molded products with excellent mechanical properties are obtained thereby.

The following examples are illustrative of the invention without being limitative.

EXAMPLE 1

In a dry glass vessel with a nitrogen atmosphere, 54.7 ml of methylhydrogenpolysiloxane having a viscosity of 30 cSt at 25°C, 0.55 gm of $AlCl_3$ and 55 ml of paraffin hydrocarbons having a boiling range of 110° to 145°C were heated with agitation to 50°C. After 15 minutes the $AlCl_3$ was completely dissolved. Then 54.7 ml of $TiCl_4$ were added and heated under vigorous agitation with a vibromixer for 6 hours at 50°C. A dark-brown suspension was formed and 35 percent of the charged $TiCl_4$ had been reduced. After cooling to 20°C and diluting with paraffin hydrocarbon to a total volume of 200 ml, dry oxygen was introduced during 20 minutes at 30°C in an amount of 20 l/hr (rotameter) with the aid of an immersion capillary causing a weak agitation. As the oxidation is exothermic, occasionally cooling had to be applied. Rinsing with 40 l/hr of $N_2$ was carried out for 7 minutes at 20°C in order to terminate the oxidation. The $Ti^{+++}$ content of the suspension was now 26 percent of the charged $Ti^{+++}$ ions. The catalyst suspension was poured into a dry 1-liter glass flask and diluted with the above solvent to a volume of 0.9 liter.

For the ethylene polymerization, 98 liters of the above paraffin hydrocarbon was charged into a 150-liter autoclave and heated to 64°C. After addition of the above catalyst suspension with rinsing of the flask with 1 liter of isooctane, in which 3.5 ml of tetrabutyl tin were dissolved, the autoclave pressure was adjusted to 10 atm. pressure of ethylene and maintained at this ethylene pressure. The polymerization time was 10¾ hours at 64°C. During the whole polymerization time the ethylene consumption was very uniform. At the end of the polymerization, the polyethylene suspension was still relatively thin and easy to stir with a concentration of 50 percent (gm polyethylene in gm of suspension). No wall coating was seen in the autoclave and the removal of heat was in no way obstructed.

After decomposition of the catalyst with a mixture of paraffin hydrocarbon/isopropanol/ethanol (vol. percent 60/20/20) at 85°C during ½ hour, separation was carried out on a centrifuge with rinsing with a mixture of 90 paraffin hydrocarbons, 5 isopropanol and 5 ethanol (percent by volume) at 60°C. The polyethylene, separated on the centrifuge and rinsed, has about 30 percent less residual moisture in comparison with the same polymerization in which a non-oxidized catalyst was utilized. A total of only 4.12 liters of solvent (paraffin hydrocarbon and alcohols) were used for each kg of dry polyethylene recovered. After drying, 68.3 kg of a pure white polyethylene powder were obtained with the following properties:

Melt index (DIN 53735, 5 kg load): 0.18 gm/10 min.

Density (DIN 53479): 0.950 gm/cm³
Oxidation ash: 120 ppm
Tap density: 555 gm/l
Bulk density (DIN 53468): 510 gm/l
Specific surface (BET): 0.3 m²/gm
Grain size: 98 percent between 100 160 μ.

COMPARISON EXPERIMENT

If a catalyst, prepared as above, however, nonoxidized, is used in 10½ hours, 62.8 kg of polyethylene were obtained. The polymerization strongly exothermed at the beginning. Near the end of the polymerization, the ethylene consumption showed a sharp decrease. The polymer suspension was already somewhat thick and difficult to stir. Properties of the polyethylene obtained:

Melt index: 0.09 gm/10 min.
Density: 0.946 gm/cm$^3$
Oxidation ash: 180 ppm
Tap density: 463 gm/l
Specific surface: 0.39 m$^2$/gm
Grain size: 92 percent between 75 and 160 $\mu$; 6 percent greater than 160 $\mu$; residue less than 75 $\mu$.

EXAMPLE 2

Proceeding as described in Example 1, however, without the addition of the tetrabutyl tin, the yield of polyethylene was reduced to 56.5 kg at the same polymerization time. The melt index of the polyethylene rose to 0.47 gm/10 min. The other properties were similar to identical. The density was up at 0.952 gm/cm$^3$, also the oxidation ash, through the lower yield, was up to 150 ppm. 2 kg of the polyethylene was screened on a swing sieve during 1 min., at 300 mesh and a residue of 4 gm = 0.2 percent was obtained. It was remarkable that no dust nuisance occurred.

EXAMPLE 3 TO 11

Three catalysts, each weighing 30 gm, were used at various polymerization temperatures for ethylene polymerization in a 25 liter autoclave:

| | |
|---|---|
| Catalyst A (as Example 1) | Without oxidation, without tetrabutyl tin |
| Catalyst B (as Example 1) | With oxidation, without tetrabutyl tin |
| Catalyst C (as Example 1) | With oxidation, with 0.4 ml of tetrabutyl tin |
| Polymerization conditions | 10 atm. of ethylene, varied polymerization temperatures as given |
| Dispersion agent | 18 liters of a paraffin hydrocarbon with a boiling range from 110° to 140°C. |

The results are given in the following table.

TABLE I

| Catalyst | Polymerization Temperature °C | kg Polyethylene | Space* Time-Yield gm/l/hr. | Tap Density gm/l | Melt Index 5 kg gm/10 min. |
|---|---|---|---|---|---|
| A | 60 | 11.7 | 58.5 | 472 | 0.03 |
| B | 60 | 12.3 | 61.5 | 521 | 0.04 |
| B** | 65 | 11.5 | 57.5 | 555 | 0.1 |
| C | 60 | 11.6 | 58 | 532 | 0.03 |
| A | 72 | 11.1 | 76.1 | 446 | 0.12 |
| B | 72 | 14.1 | 70.5 | 490 | 0.22 |
| C | 72 | 13.9 | 69.5 | 520 | 0.23 |
| A | 85 | 9.9 | 79.2 | 390 | 0.67 |
| C | 85 | 13.2 | 72.8 | 490 | 1.95 |

* Based on 25 liter pot volume.
** Catalyst oxidation 30 min. instead of 20 min with 20 l/hr. at 30°C (22% of Ti$^{+++}$)

It can be seen that at the lowest polymerization temperature the highest tap densities were obtained. The catalysts B and C were clearly superior to the catalyst A in regard to the packed density of the obtained polyethylene. At the higher polymerization temperatures, catalysts B and C also give high yields of polyethylene.

EXAMPLE 12

Ethylene was continuously polymerized at 65°C and 10 atm. in a 25 liter autoclave with isooctane as the dispersing agent. 4.6 Grams of catalyst and 3 liters of isooctane were dosed in per hour. The polymer concentration was 40 gm of polyethylene for each 100 gm of polymer suspension. The catalyst was prepared as described in Example 1, catalyst oxidation: 24 min. at a rate of 20 liter of O$_2$/hr. at 30°C. After processing, as described in Example 1, 32 kg of polyethylene per 24 hours were obtained having the following properties:

Melt index: 0.50 gm/10 min.
Density: 0.953 gm/cm$^3$
Oxidation ash: 140 ppm
Tap density: 510 gm/l
Grain distribution: 95 percent between 100 and 150 $\mu$,
1.5 percent <50 $\mu$.

For each kg of dry polyethylene in this experiment, 7.1 liters of solvent were used in the cycle.

EXAMPLE 13

A polymerization experiment, conducted analogous to Example 12 can be carried out at 85°C without stirring and deposit difficulties at a concentration of 45.5 percent. Only 5.5 liters of solvent were required in the cycle for each kg of polyethylene. The obtained polyethylene, 41.3 kg per 24 hour, had the following properties:

Melt index: 16 gm/10 min.
Density: 0.963 gm/cm$^3$
Oxidation ash: 130 ppm
Tap density: 500 gm/l
Grain distribution: 97 percent between 70 and 160 $\mu$, 1 percent < 50 $\mu$.

EXAMPLE 14

A catalyst was prepared from 5 ml of methylhydrogenpolysiloxane having a viscosity of 35 cSt at 25°C, 0.3 gm of AlCl$_3$ and 5 ml of TiCl$_4$, by agitating at 50°C during 5 hours. After the dilution of the catalyst suspension with 5 ml of paraffin hydrocarbon having a boiling range of 110° to 145°C, oxygen, dried over molecular sieves, was passed through a capillary with cooling and stirring into the suspension at temperature maximum of 36°C, with a velocity of 10 l/hr for a period of 40 min. After the oxygen treatment, dry nitrogen was passed through the same capillary at 20°C at a rate of 10 l/hr for a period of 15 min. The Ti$^{+++}$ content of the catalyst was 40 percent before the oxidation, 27 percent after 20 min. and 20 percent after 40 min. of oxidation.

10 percent of the oxidized catalyst was charged together with 600 ml of paraffin hydrocarbon into a 1 liter vessel with ethylene for the polymerization at 10atm. of ethylene at 75°C. After 2 hours and subsequent processing and drying 201 gm of polyethylene powder were obtained with a tap density of 454 gm/l, a melt index (5 kg) of 2.2 and a density of 0.956 gm/cm³.

COMPARISON EXPERIMENTS TO EXAMPLE 14 a. If, analogous to Example 14, a non-oxidized catalyst was used for the ethylene polymerization, the polymer yield was 198 gm with a tap density of only 347 gm/l.

b. A Ziegler catalyst was prepared from 9.3 ml of diethyl aluminum chloride and 5.5 ml $TiCl_4$ (1.5 to 1 mol) in 9.3 ml of paraffin hydrocarbon by heating for 90 minutes at 50°C under purest nitrogen and diluted with an additional 10 ml of solvent. Then the suspensions were oxidized at 20°C, otherwise analogous to Example 14. An almost clear solution was formed. 17.5 percent of the oxidized and purged with nitrogen catalyst was charged in 1.2 liters of diluent and ethylene at normal pressure and 75°C for the polymerization (combined gas process). No solid polymerizate was formed c. In an anlogous polymerization experiment at normal pressure with a catalyst employed in an amount of 20 percent and oxidized analogous to Example 14, there resulted, however, after a two hour polymerization time, a polyethylene yield of 215 gm.

d. If, for the polymerization, analogous to Example 14 of (c) above, 1.5 percent of the Ziegler catalyst, oxidized as (b) above, was added, the polymerization speed of the ethylene was clearly reduced and only 82 gm of polyethylene with tap density of 403 gm/l were obtained.

EXAMPLE 15

The preparation of the catalyst was carried out, as described in Example 1. Isooctane was used as the diluent. The catalyst oxidation was conducted at 10°C with 20 l of $O_2$/hr. for a period of 60 min. and 13 percent of the $Ti^{+++}$ was oxidized. The ethylene polymerization was conducted as in Example 1, but with a polymerization temperature of 60°C. For the activation of the catalyst, 5 ml of the same hydrogenpolysiloxane were added at the start of the polymerization. After processing and drying 67.5 kg of white polyethylene powder were obtained in a space-time-yield of 45 gm/l/hr.

PROPERTIES:

Melt index: (5 kg): 0.04
Density: 0.948 gm/cm³
Tap density: 521 gm/l

EXAMPLE 16

The polymerization and catalyst preparation were conducted analogous to Example 15, but the catalyst was oxidized, however, for only 30 minutes and 7.7 percent of the $Ti^{+++}$ ions were oxidized.

73.8 kg of polyethylene were obtained in a space-time yield of 53.5 gm/l/hr.

PROPERTIES:

Melt index (5 kg): 0.05
Density: 0.948 gm/cm³
Tap density: 510 gm/l

The polyethylene powder can be processed on a double screw extruder or on a planet roll extruder to give pipes of extreme impact tenacity and strength.

COMPARISON EXPERIMENT TO EXAMPLE 16

A non-oxidized catalyst polymerized ethylene under the above conditions only to a yield of 52.3 kg, with a space-time-yield of 35 gm/l/hr.

PROPERTIES:

Melt index (5 kg): 0.05
Density: 0.948 gm/cm³
Tap density: 450 gm/l

EXAMPLE 17

The compounds listed in Example 1 were used for the catalyst preparation. The oxidation of the catalyst suspension was carried out at 30°C with 95.5 l/hr. of dry air for a period of 15 minutes and 8 percent of the $Ti^{+++}$ ions were oxidized. After diluting to 0.9 liters, 5 ml of triethylsilane were added with agitation.

After transfer to the polymerization autoclave, the polymerization was carried out as in Example 1, however at a temperature of 82.5°C. 68.3 kg of polyethylene were obtained in a space-time-yield of 43 gm/l/hr with the following properties:

Melt index (5 kg): 4.8 gm/10 min.
Density: 0.958 gm/cm³
Tap density: 543 gm/l
Grain size: 94 percent between 100 and 160 $\mu$
    Residue > 160 $\mu$.

Molded bodies with great impact tenacity and crack resistance to tension can be produced from this polyethylene powder by the injection molding process without difficulty.

EXAMPLE 18

The catalyst preparation and polymerization was as in Example 17, however, instead of triethylsilane, 3.8 ml of tetrabutyl tin were added dropwise to the catalyst after oxidation. After an ethylene polymerization at 75°C, 71 kg of polyethylene were obtained with the following properties:

Melt index (5 kg): 1.1 gm/10 min.
Density: 0.956 gm/cm³
Tap density: 550 gm/l
Grain size: 92 percent between 100 and 160 $\mu$
    7 percent > 160 $\mu$
    1 percent < 100 $\mu$.

Towards the end of the polymerization the charge was still well stirrable. No polymer deposits were observed on the walls or the agitator of the reactor.

The polyethylene powder can be processed on the conventional flame spray machines without difficulties to give hollow bodies of any kind.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A catalyst for the production of polyethylene powder of high density and high tap density consisting essentially of the reaction product of (a) about one part by volume of a hydrogenpolysiloxane with structural units having the formula

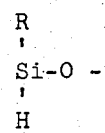

where R is a member selected from the group consisting of alkyl having 1 to 6 carbom atoms, cycloalkyl having 5 to 6 carbon atoms and phenyl, with the terminal silicons satisfied with R, hydrogen or, at most, one hydroxyl and having a viscosity of from 5 to 100 cSt (25°C), (b) about 0.5 to 2.0 parts by volume of a compound selected from the group consisting of titanium tetrachloride, titanium trichloride in mixture with titanium tetrachloride and the addition complex $AlTi_3Cl_{12}$, and (c) about 0 to 0.2 parts by volume of a compound selected from the group consisting of aluminum chloride and aluminum bromide, treated, in the presence of from 0 to 2 parts by volume of a saturated hydrocarbon having 5 to 9 carbon atoms, with oxygen at a temperature of from −40°C to +60°C for a time sufficient that from 5 percent to 50 percent of the titanium ions present in a lower valence are oxidized to their highest valence, and (d) further activated by the addition of from 0 to 30 percent by weight, based on said oxidized catalyst, of monomeric and/or polymeric organic compounds of silicon and/or tin selected from the group consisting of monomeric silanes with at least one hydrogen atom bonded to silicon, tetraalkyl tin, tetramethyldisiloxane, tin tributylhydride and hydrogenpolysiloxane with structural units having the formula

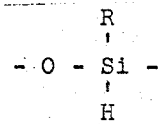

wherein R is a member selected from the group consisting of alkyl having 1 to 6 carbon atoms and phenyl, and having a viscosity of from 2 to 50,000 cSt (25°C), to the oxidized catalyst.

2. The catalyst of claim 1 wherein said component (a) is methylhydrogenpolysiloxane having a viscosity of from 5 to 100 cSt (25°C), said component (b) is titanium tetrachloride, and said component (c) is aluminum chloride.

3. A process for the preparation of the catalyst of claim 1 which consists essentially of reacting said components, (a), (b), and (c) at a temperature of from 20°C to 80°C under an anhydrous inert atmosphere until hydrogen evolution has ceased, treating said reaction product with oxygen at a temperature of from −40°C to +60°C for a time sufficient that from 5 percent to 50 percent of the titanium ions present in a lower valence are oxidized to their highest valence, and recovering said catalyst.

4. In a process for the production of polyethylene powder of high density and high tap density which comprises polymerizing ethylene at a temperature of from 20°C to 200°C and a pressure of from 1 to 100 atmospheres in the presence of a polymerization catalyst prepared from (a) about 1 part by volume of a hydrogenpolysiloxane with structural units having the formula

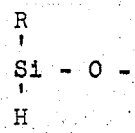

where R is a member selected from the group consisting of alkyl having 1 to 6 carbon atoms, cycloalkyl having 5 to 6 carbon atoms and phenyl, with the terminal silicons satisfied with R, hydrogen or, at most, one hydroxyl and having a viscosity of from 5 to 100 cSt (25°C), (b) about 0.5 to 2 parts by volume of a compound selected from the group consisting of titanium tetrachloride, titanium trichloride in mixture with titanium tetrachloride and the addition complex $AlTi_3Cl_{12}$, and (c) about 0 to 0.2 parts by volume of a compound selected from the group consisting of aluminum chloride and aluminum bromide, the improvement which consists in treating said prepared catalyst in the presence of from 0 to 2 parts by volume of a saturated hydrocarbon having 5 to 9 carbon atoms, before said polymerization, with oxygen at a temperature of from −40°C to +60°C for a time sufficient that from 5 percent to 50 percent of the titanium ions present in a lower valence are oxidized to their highest valence and (d) further activating the oxidized catalyst by the addition thereto of from 0 to 30 percent by weight, based on said oxidized catalyst, of a monomeric and/or polymeric organic compound of silicon and/or tin selected from the group consisting of monomeric silanes with at least one hydrogen atom bonded to silicon, tetraalykl tin, tetramethyldisiloxane, tin tributylhydride and hydrogenpolysiloxane with structural units having the formula

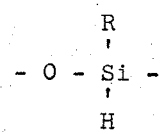

wherein R is a member selected from the group consisting of alkyl having 1 to 6 carbon atoms and phenyl, and having a viscosity of from 2 to 50,000 cSt (25°C).

5. The process of claim 4 wherein said component (d) is present in an amount of from 0.1 percent to 30 percent by weight based on said oxidized catalyst.

6. The process of claim 5 wherein said component (d) is triethylsilane.

7. The process of claim 5 wherein said component (d) is tetrabutyl tin.

8. The process of claim 5 wherein said component (d) is methylhydrogenpolysiloxane.

9. The process of claim 5 wherein said component (d) is hydrogenpolysiloxane having a viscosity of 2 to 50,000 cSt (25°C) and a partial formula

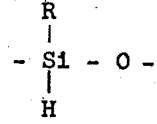

wherein R is a member selected from the group consisting of alkyl and having 1 to 6 carbons and phenyl.

10. The process of claim 4 wherein anhydrous air is employed as the source of said oxygen.

11. The process of claim 4 wherein said oxidized catalyst is treated with an inert gas after said oxygen treatment.

12. The process of claim 4 wherein said treatment with oxygen is effected at a temperature between 0 and 40°C.

13. The process of claim 4 wherein said component (a) is methylhydrogenpolysiloxane having a viscosity of from 5 to 100 cSt (25°C), said component (b) is titanium tetrachloride, and said component (c) is aluminum chloride.

* * * * *